United States Patent
Komatsu

[11] Patent Number: 6,137,474
[45] Date of Patent: *Oct. 24, 2000

[54] COORDINATE AND SWITCHING INPUT APPARATUS WITHOUT ADDITIONAL ELEMENTS FOR DETECTING A SWITCHING OPERATION

[75] Inventor: Masaru Komatsu, Fukushima-ken, Japan

[73] Assignee: Alps Electric Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/885,709

[22] Filed: Jun. 30, 1997

[30] Foreign Application Priority Data

Jul. 1, 1996 [JP] Japan ................................ 8-171162

[51] Int. Cl.7 .............................. G09G 5/08; G06F 3/033
[52] U.S. Cl. ............................................................ 345/161
[58] Field of Search .................................... 345/156, 157, 345/161, 168; 341/20; 74/471 XY; 324/601, 130; 702/109

[56] References Cited

U.S. PATENT DOCUMENTS

| | | | |
|---|---|---|---|
| 5,440,237 | 8/1995 | Brown et al. | 702/109 |
| 5,541,622 | 7/1996 | Engle et al. | 345/161 |
| 5,579,033 | 11/1996 | Rutledge et al. | 345/161 |
| 5,689,285 | 11/1997 | Asher | 345/161 |
| 5,696,535 | 12/1997 | Rutledge et al. | 345/156 |
| 5,793,356 | 8/1998 | Svancarek et al. | 345/161 |

*Primary Examiner*—Jeffery Brier
*Attorney, Agent, or Firm*—Brinks Hofer Gilson & Lione

[57] ABSTRACT

A coordinate input apparatus is provided which is capable of detecting a switching operation of a stick-type operation section without providing a specific sensor and/or circuit element for detecting a switching operation. The coordinate input apparatus includes a stick-type operation section, pressure sensor sections for detecting operational loads in directions intersecting at right angles to each other when the operation section is operated and outputting the detected operational loads as load data, a coordinate computation section for computing the amount of cursor movement in directions intersecting at right angles to each other corresponding to the size of the operational load from the load data, a storage section for storing load data when load data is sampled at a predetermined time interval, a peak value detection section for computing the peak value of the stored load data of the storage section, a time measurement section for measuring the time during which the stored load data continuously exceeds a threshold value, an inclination computation section for computing the load change inclination value per unit time from the stored load data, and an operation determination section for determining whether the operation of the operation section is a normal pressing operation or a switching operation on the basis of the peak value, the threshold-value exceeding time, and the value of the load change inclination.

2 Claims, 2 Drawing Sheets

COORDINATE AND SWITCHING INPUT APPARATUS WITHOUT ADDITIONAL ELEMENTS FOR DETECTING A SWITCHING OPERATION

BACKGROUND OF THE INVENTION

1. Field of the Invention

The present invention relates to a coordinate input apparatus. More particularly, the present invention relates to a coordinate input apparatus provided with means for determining whether, when a stick-type operation section provided in a keyboard device or the like is operated, the operation is a normal stick operation or a switching operation.

2. Description of the Related Art

Hitherto, as keyboard devices, there are known a type having only various operation keys arranged in a predetermined sequence in the operation section and a type (hereinafter, this type will be referred to as a "keyboard device with a stick-type operation section") having such operation keys and one stick-type operation section (stick pointer) at a predetermined position among the operation keys.

Meanwhile, in a known keyboard device with a stick-type operation section, a distortion gauge (a total of four distortion gauges) is bonded onto each side of the base portion of the stick-type operation section along two directions, i.e., along the X direction and the Y direction, intersecting at right angles to each other. These distortion gauges are structured in such a way that two distortion gauges are connected in series between a DC power supply and a ground in each of the X and Y directions, and outputs corresponding to operational pressures (load forces) in each of the X and Y directions are guided out from the connection points of the two distortion gauges which are connected in series. When the tip of the stick-type operation section is pressed in a desired direction by the fingertip of the key operator, the load force applied to the stick-type operation section is applied to the respective distortion gauges in each of the X and Y directions, causing each of the values of these distortion gauges to vary. At this time, changes in these resistance values are detected as voltage changes in each of the X and Y directions, and thus by reading the detection output, load data indicating the load force at the tip of the stick-type operation section is obtained. Then, the obtained load data is subjected to digital conversion and other data processing and is converted into coordinate data within the keyboard device with a stick-type operation section. Next, the coordinate data is transmitted from a communication control section within the keyboard device with a stick-type operation section to a main unit, such as a personal computer, through a cable.

On the main unit side, the coordinate data supplied from the keyboard device with a stick-type operation section is appropriately processed, after which the data is supplied to a display section, causing a cursor displayed on the display section to move. In this case, the movement direction of the cursor is determined in response to the direction of the pressing operation applied to the stick-type operation section, and the movement speed of the cursor is determined in response to the magnitude of a load force during a pressing operation applied to the stick-type operation section.

In the keyboard device with a stick-type operation section, when the key operator presses the tip of the stick-type operation section in a desired direction, a load force due to the pressing operation is applied to the respective distortion gauges in each of the X and Y directions, causing each of the resistance value of these distortion gauges to vary. Changes in these resistance values are detected as voltage changes in each of the X and Y directions and are formed into load data along the X and Y directions.

Some keyboard devices with a stick-type operation section have, as an operation function in the stick-type operation section, an operation function which assumes an impact load force obtained when the tip of the stick-type operation section is struck as a switching operation, in addition to the operation function for pressing the tip of the stick-type operation section in a desired direction. In such a case, in the keyboard device with a stick-type operation section having the switching operation function, a pressure sensor, for example, an auxiliary distortion gauge, for detecting an impact load force along the length direction (Z direction) is disposed additionally in the base portion of the stick-type operation section. In this auxiliary distortion gauge, load data along the Z direction indicating the impact load force of the stick-type operation section is detected, and the detected Z-direction load data is processed together with the X-direction and Y-direction load data. Then, the processed load data along the X and Y directions are transmitted as coordinate data, and the processed load data along the Z direction is transmitted as switch data from the communication control section to the main unit, and the cursor position corresponding to the coordinate data and the switch data supplied to the display section of the main unit is displayed.

The known keyboard device with a stick-type operation section having a switching operation function is capable of detecting a pressing operation of the stick-type operation section and a switching operation of the stick-type operation section. However, when a switching operation is detected, and when the detection output is to be converted into switch data, it is necessary to additionally dispose an auxiliary distortion gauge (pressure sensor) and a specific circuit element for performing the conversion process. Therefore, there arises problems in that the construction of the keyboard device becomes complex by an amount corresponding to the additional components, and the cost of manufacturing it becomes expensive.

SUMMARY OF THE INVENTION

The present invention has been achieved to solve the above-described problems. An object of the present invention is to provide a coordinate input apparatus capable of detecting a switching operation of a stick-type operation section without providing a specific sensor and/or circuit element for detecting a switching operation.

To achieve the above object, the coordinate input apparatus in accordance with the present invention comprises: means for determining whether the stick-type operation section is pressed or switch-operated by checking whether the peak load value of an operational load obtained when the stick-type operation section is operated is greater than a predetermined load value, whether the time during which the load value exceeds a threshold value is smaller than a set time, and whether the maximum value of the inclination of the changed state is greater than a set value.

Use of such means eliminates the need to provide a specific sensor and/or circuit element for detecting a switching operation in a case in which the switching operation of the stick-type operation section is to be detected, making it possible to prevent the construction of the coordinate input apparatus from becoming complex and to reduce its manufacturing cost.

In accordance with the present invention, the coordinate input apparatus comprises: a stick-type operation section; pressure sensor sections, disposed on the sides of the base of the stick-type operation section, for detecting operational loads in the X and Y directions intersecting at right angles to each other, when the stick-type operation section is operated, and outputting the detected operational loads as load data; a coordinate computation section for computing the amount of cursor movement in the X and Y directions corresponding to the detected load force; a storage section for sampling the load data output from the pressure sensor sections at every predetermined time interval and storing the load data at a sampling time; a peak value detection section for computing the peak value of the load data stored in the storage section; a time measurement section for measuring a threshold-value exceeding time during which the stored load data continuously exceeds a threshold value; an inclination computation section for computing the value of a load change inclination per unit time on the basis of the stored load data; and an operation determination section for determining whether a normal pressing operation or a switching operation of the stick-type operation section has been performed on the basis of the peak value computed by the peak value detection section, the threshold-value exceeding time measured by the time measurement section, and the value of the load change inclination computed by the inclination computation section.

According to the present invention, for the operational load obtained when the stick-type operation section is operated, each of the peak load value computed by the peak value detection section, the time during which the load value measured by the time measurement section exceeds a threshold value, and the value of the inclination of the load change computed by the inclination computation section is supplied to the operation determination section, and a determination is made by the operation determination section whether the operation of the stick-type operation section is a normal pressing operation or a switching operation on the basis of these supplied values and time. All of the peak value detection section, the time measurement section, the inclination computation section, and the operation determination section are formed of general-purpose circuit elements, and these elements need only to be operated in a versatile manner. Therefore, there is no need to additionally provide a specific sensor and/or circuit element for detecting a switching operation when a switching operation of the stick-type operation section is to be detected. From this point, the construction of the coordinate input apparatus does not become complex, and the cost of manufacturing it can be reduced.

The above and further objects, aspects and novel features of the invention will become more apparent from the following detailed description when read in connection with the accompanying drawings.

DESCRIPTION OF THE PREFERRED EMBODIMENT

A preferred embodiment of the present invention will be described below with reference to the accompanying drawings.

Figure 1:
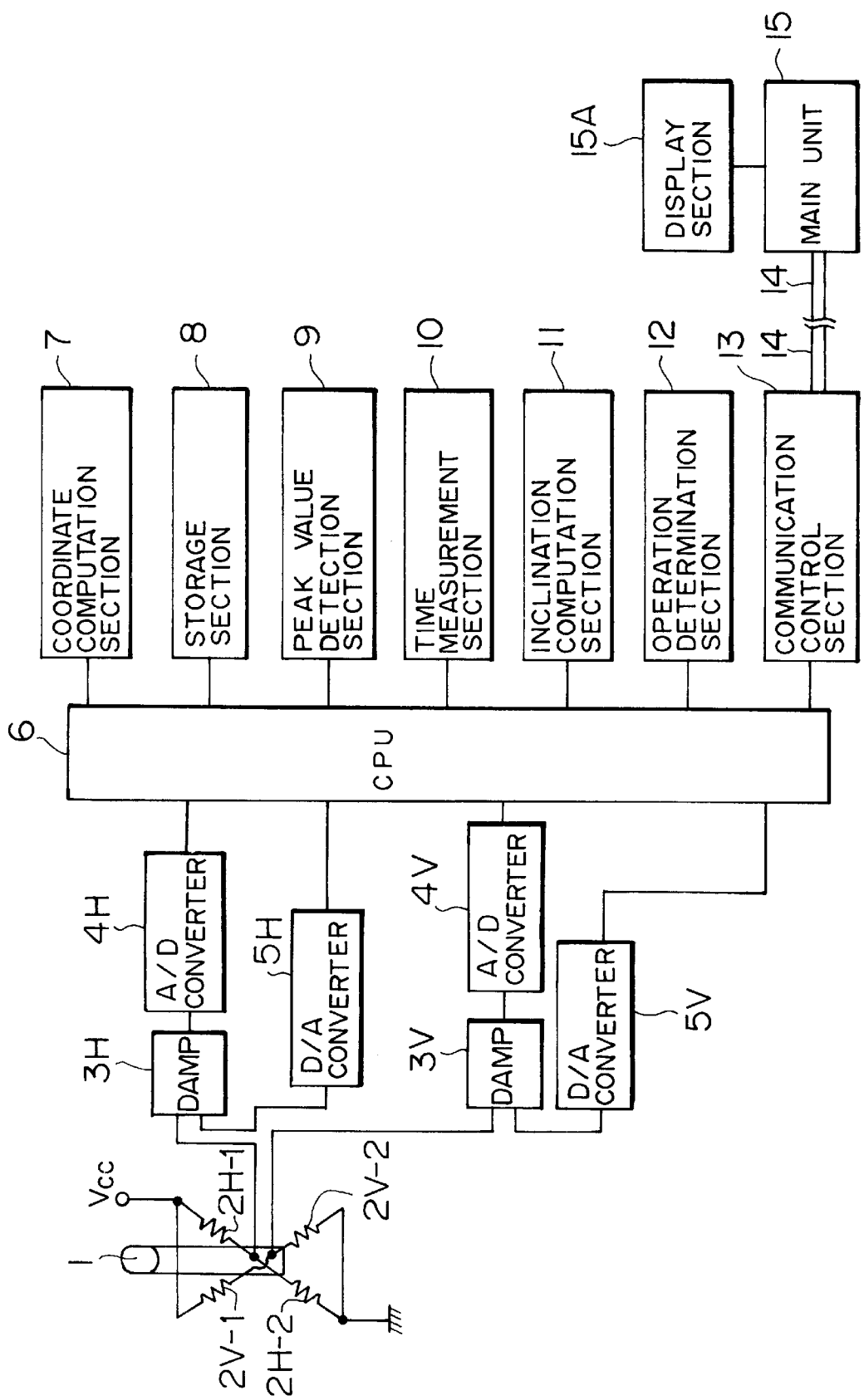
FIG. 1 is a block diagram illustrating the construction of an embodiment of a coordinate input apparatus according to the present invention.

FIG. 1 is a block diagram illustrating the construction of an embodiment of a coordinate input apparatus according to the present invention, and also illustrates an example of a keyboard device having a stick-type operation section as a coordinate input apparatus.

As shown in FIG. 1, in a stick-type operation section 1, two distortion gauges (pressure sensors) 2H-1 and 2H-2 disposed along the transverse direction are bonded to both sides of the base portion thereof along the transverse direction (in the X-axis direction), and two distortion gauges (pressure sensors) 2V-1 and 2V-2 disposed along the longitudinal direction are bonded to both sides of the same base portion along the longitudinal direction (in the Y-axis direction). The two distortion gauges 2H-1 and 2H-2 disposed along the transverse direction are connected in series between a power terminal Vcc and a ground, and the two distortion gauges 2V-1 and 2V-2 disposed along the longitudinal direction are also connected in series between the power terminal Vcc and the ground. Here, if the tip of the stick-type operation section 1 is pressed by the fingertip of the key operator, the resistance values of the distortion gauges 2H-1 and 2H-2 relatively vary in response to the magnitude and polarity of the transverse components of the pressing force, and in a similar manner, the resistance values of the distortion gauges 2V-1 and 2V-2 disposed along the longitudinal direction also relatively vary in response to the magnitude and polarity of the longitudinal components of the pressing force. A differential amplifier (DAMP) 3H disposed along the transverse direction is connected at one end to the connection point of the two distortion gauges 2H-1 and 2H-2 disposed along the transverse direction and connected at the other end to the output terminal of a digital/analog (D/A) converter 5H disposed along the transverse direction. A differential amplifier (DAMP) 3V disposed along the longitudinal direction is also connected at one end to the connection point of the two distortion gauges 2V-1 and 2V-2 disposed along the longitudinal direction and connected at the other end to the output terminal of a digital/analog (D/A) converter 5V disposed along the longitudinal direction. An analog/digital (A/D) converter 4H disposed along the transverse direction is connected at its input terminal to the output terminal of the differential amplifier 3H disposed along the transverse direction, and an analog/digital converter (ADC) 4V disposed along the longitudinal direction is connected at its input terminal to the output terminal of the differential amplifier 3V disposed along the longitudinal direction. The analog/digital converter 4H disposed along the transverse direction is connected at its output terminal to a central processing unit (CPU) 6, and the analog/digital converter 4V disposed along the longitudinal direction is connected at its output terminal to the central processing unit. The digital/analog converter 5H disposed along the transverse direction is connected at its input terminal to the central processing unit 6 and connected at its output terminal to the other input terminal of the differential amplifier 3H disposed along the transverse direction. The digital/analog converter 5V disposed along the longitudinal direction is also connected at its input terminal to the central processing unit 6 and connected at its output terminal to the other input terminal of the differential amplifier 3V disposed along the longitudinal direction.

Further, a coordinate computation section 7, a storage section 8, a peak value detection section 9, a time measurement section 10, an inclination computation section 11, and an operation determination section 12 are each connected to the central processing unit 6. A communication control section 13 is connected at its input terminal to the central processing unit 6 and connected at its output terminal to the input terminal of a main unit 15, such as a personal computer, through a transmission cable 14 and further a display section 15A, such as a display device, is connected to the main unit 15.

Figure 2:
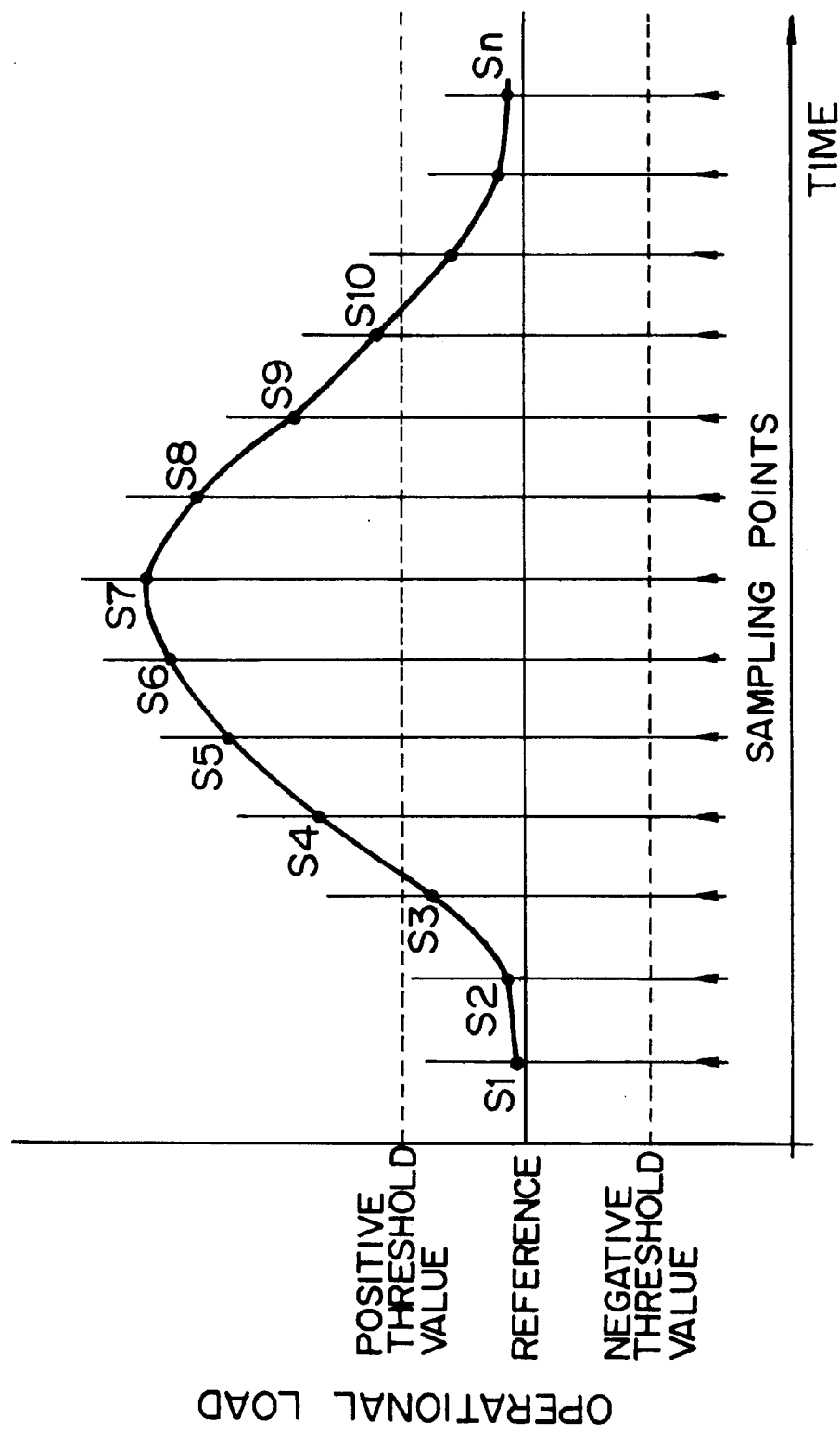
FIG. 2 is an operation characteristic view illustrating an example of changes in an operational load when a stick-type operation section is operated.

FIG. 2 is an operation characteristic view illustrating an example of changes in operational load when a stick-type operation section is operated.

Here, the operation of a keyboard device of this embodiment will be described with reference to FIG. 2. However, in this embodiment, the operations performed by each of the components 2H-1, 2H-2, 3H and 5H disposed along the transverse direction and the operations performed by each of the components 2V-1, 2V-2, 3V and 5V disposed along the longitudinal direction are substantially the same; and therefore, in the following description of the operations, only the operations performed by each of the components 2H-1, 2H-2, 3H and 5H disposed along the transverse direction will be described, and a description of the operations performed by each of the components 2V-1, 2V-2, 3V and 5V disposed along the longitudinal direction has been omitted.

When the key operator operates the stick-type operation section 1, each of the resistance values of the distortion gauges 2H-1 and 2H-2 disposed along the transverse direction vary in response to the direction of the operation and the magnitude of the load force applied during operation. In response to these changes in the resistance values, a DC voltage (load data) indicating the load force during the operation of the stick-type operation section 1 occurs at the connection point of the distortion gauges 2H-1 and 2H-2 disposed along the transverse direction, and this DC voltage is supplied to the differential amplifier 3H disposed along the transverse direction. The differential amplifier 3H disposed along the transverse direction differentially amplifies this DC voltage and a correction value supplied from the digital/analog converter 5H disposed along the transverse direction and generates an output voltage of the difference between them. The analog/digital converter 4H disposed along the transverse direction converts the output voltage of the differential amplifier 3H disposed along the transverse direction into digital form and supplies the result, as digital load data indicating the load force, to the central processing unit 6.

When the digital load data is supplied from the analog/digital converter 4H disposed along the transverse direction, the central processing unit 6 supplies the digital load data to the coordinate computation section 7 and the storage section 8.

Initially, the coordinate computation section 7 computes the amount of movement of the cursor (the cursor displayed on the display section 15A of the main unit 15) in the X direction from the size of the supplied digital load data. Then, the obtained coordinate data indicating the amount of movement in the X direction is supplied from the central processing unit 6 to the communication control section 13. The communication control section 13 causes the supplied coordinate data to be transmitted from the keyboard device through the transmission cable 14 to the main unit 15 of an externally connected personal computer or the like. The main unit 15 appropriately performs a conversion process on the supplied coordinate data and supplies it to the display section 15A whereby the cursor displayed on display section 15A is appropriately moved horizontally in accordance with the information of the coordinate data. The storage section 8, as shown in FIG. 2, samples the supplied digital load data at a fixed time interval (sampling cycle) t and stores each of the digital load data values S1, S2, S3 . . . , Sn obtained at respective sampling times. The peak value detection section 9 computes the peak values of the digital load data values S1, S2, S3 . . . , Sn stored in the storage section 8, for example, the digital load data value S7, in the example shown in FIG. 2. The time measurement section 10 measures the time during which the digital load data values S1, S2, S3 . . . , Sn stored in the storage section 8 continuously exceed a threshold value (positive threshold value), for example, the time from when the digital load data value S4 is obtained until the digital load data value S10 is obtained, in the example shown in FIG. 2. FIG. 2 shows a case in which the operational load changes in a positive direction; when the operational load changes in a negative direction, a negative threshold value is applied. The inclination computation section 11 computes the load change inclination per unit time from the digital load data values S1, S2, S3, . . . , Sn stored in the storage section 8, i.e., a maximum of the values obtained by dividing the difference between the adjacent digital load data values S1–S2, S2–S3, S3–S4, . . . S(n−1)–Sn by a sampling cycle t, for example, a value obtained by dividing the difference between the digital load data values S8–S9 by a sampling cycle t, in the example shown in FIG. 2.

Next, the operation determination section 12 determines whether the peak value (the digital load data value S7) of the digital load data value computed by the peak value detection section 9 is greater (Y) or not (N) than an internally preset digital set value, whether the threshold-value exceeding time (the time from when the digital load data value S4 is obtained until the digital load data value S10 is obtained) computed by the time measurement section 10 is smaller (Y) or not (N) than an internally preset digital set value, and whether the maximum value (the value obtained by dividing the difference between the digital load data values S8–S9 by the sampling cycle t) of the load change inclination, computed by the communication control section 11, is greater (Y) or not (N) than an internally preset set load change inclination. In these determinations, when a determination of (Y) is obtained for the peak value of the load data value, the threshold-value exceeding time, and the maximum value of the load change inclination, the operation determination section 12 determines that a switching operation has been performed in the stick-type operation section 1, and outputs switching operation data. When a determination of at least one or more (N) is obtained in either one of the peak value of the load data value, the time during which the load value exceeds the threshold value, and the maximum value of the load change inclination, the operation determination section 12 determines that a normal pressing operation has been performed in the stick-type operation section 1, and does not output switching operation data. Then, the obtained switching operation data is supplied from the central processing unit 6 to the time measurement section 10, and the communication control section 13 causes the supplied switching operation data to be transmitted from the keyboard device to the main unit 15, such as an externally connected personal computer. The main unit 15 appropriately performs a conversion process on the supplied switching operation data and supplies it to the display section 15A, causing the cursor displayed on the display section 15A to perform a process corresponding to the contents of the information of the switching operation data.

As described above, according to this embodiment, for the load data obtained during the operation of the stick-type operation section 1, each of the peak load value computed by the peak value detection section 9, the time during which the load value exceeds a threshold value, computed by the time measurement section 10, and the value of the inclination of the load change, computed by the inclination computation section 11, is supplied to the operation determination section 12. The operation determination section 12 determines whether the operation of the stick-type operation section 1 is a normal pressing operation or a switching operation on the basis of these values and time. All of the peak value detection section 9, the time measurement section 10, the inclination computation section 11, and the operation determination section 12 are formed of general-purpose circuit elements, and these circuit elements operate in a versatile manner. Therefore, when the switching operation of the stick-type operation section 1 is to be detected, a specific sensor and/or circuit element for detecting the switching operation need not additionally to be provided. From this point, the construction of the keyboard device does not become complex, and further its manufacturing cost can be reduced.

Although in this embodiment an example is described in which a coordinate input apparatus is a keyboard device, the coordinate input apparatus of the present invention is not limited to a keyboard device, and it is clear that the present invention can be applied to other coordinate input apparatuses similar to this device.

As has been described up to this point, according to the present invention, when a switching operation during the operation of a stick-type operation section is to be detected, there is no need to provide a specific sensor and/or circuit element for detecting the switching operation. Therefore, the present invention has advantages in that the construction of a coordinate input apparatus is not complex, and the cost of manufacturing a coordinate input apparatus can be reduced.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A coordinate input apparatus, comprising:

a stick-type operation section having a cursor motion operating function and a switch operating function;

operating force sensors operative to detect operational loads in the X and Y directions when said stick-type operation section is operated and output the detected operational loads as load data, the operating force sensors intersecting at right angles to each other;

a coordinate computation section operative to compute the amount of cursor movement in the X and Y directions corresponding to the magnitude of the operational load from said load data;

a storage section for storing the load data outputted from the operating force sensors;

a peak value detection section operative to calculate the peak value of each of the load data stored in said storage section;

a time measurement section operative to measure a threshold-value exceeding time during which each of said stored load data continuously exceeds a threshold value;

an inclination computation section operative to compute the value of a load change inclination per unit time on the basis of said stored load data; and an operation determination section operative to determine a cursor moving operation or a switching operation of said stick-type operation section on the basis of:
        comparison between the peak value computed by said peak value detection section and a preset load value;
        the threshold-value exceeding time measured by said time measurement section; and
        comparison between a maximum value of the load variation inclination value computed by said inclination computation section and a preset inclination value.

2. A coordinate input apparatus according to claim 1, wherein said operation determination section determines that a switching operation has been performed when:

said peak value of the load data of at least one of the load data in the X direction based on said load force in the X direction and the load data in the Y direction based on said load force in the Y direction is greater than the preset load value, the maximum value of the load change inclination is greater than a preset inclination value, and said threshold value exceeding time is smaller than a preset time, and otherwise determines that a pressing action to perform a cursor moving function has been performed.

* * * * *